US011514218B1

(12) United States Patent
Negi et al.

(10) Patent No.: US 11,514,218 B1
(45) Date of Patent: Nov. 29, 2022

(54) SYSTEM AND METHOD FOR PERFORMING STATIC TIMING ANALYSIS OF ELECTRONIC CIRCUIT DESIGNS USING A TAG-BASED APPROACH

(71) Applicant: Cadence Design Systems, Inc., San Jose, CA (US)

(72) Inventors: Hemendra Singh Negi, Uttar Pradesh (IN); Naresh Kumar, Uttar Pradesh (IN); Arunjai Singh, Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/390,247

(22) Filed: Jul. 30, 2021

(51) Int. Cl.
*G06F 30/3315* (2020.01)
*G06F 30/31* (2020.01)
*G06F 119/12* (2020.01)
*G06F 111/02* (2020.01)

(52) U.S. Cl.
CPC .......... *G06F 30/3315* (2020.01); *G06F 30/31* (2020.01); *G06F 2111/02* (2020.01); *G06F 2119/12* (2020.01)

(58) Field of Classification Search
CPC .. G06F 30/3315; G06F 30/31; G06F 2111/02; G06F 2119/12
See application file for complete search history.

(56) References Cited

U.S. PATENT DOCUMENTS

| | | | | |
|---|---|---|---|---|
| 7,290,233 B2 * | 10/2007 | Curtin | ................. | G06F 30/3312 716/108 |
| 9,633,159 B1 * | 4/2017 | Parikh | ..................... | H01L 21/00 |
| 9,679,092 B1 * | 6/2017 | Jha | ....................... | G06F 30/3323 |
| 9,785,737 B2 * | 10/2017 | Hathaway | ........... | G06F 30/3312 |
| 9,798,850 B2 * | 10/2017 | Elmendorf | ........... | G06F 30/398 |
| 10,078,717 B1 * | 9/2018 | Venkataramani | ..... | G06F 30/327 |
| 10,223,493 B1 * | 3/2019 | Spyrou | ............... | G06F 30/3312 |
| 10,303,833 B1 * | 5/2019 | Gayasen | ............... | G06F 30/398 |
| 10,691,854 B1 * | 6/2020 | Wang | .................. | G06F 30/3312 |
| 10,769,333 B1 * | 9/2020 | Ziv | ........................ | G06F 30/30 |
| 11,003,821 B1 * | 5/2021 | Pothukuchi | ........... | G06F 30/333 |
| 11,036,908 B1 * | 6/2021 | Chingudi | ............ | G06F 30/3312 |
| 2008/0005710 A1 * | 1/2008 | Fornaciari | ........... | G06F 30/3312 716/108 |
| 2009/0150103 A1 * | 6/2009 | Ellavsky | ........ | G01R 31/318357 702/79 |
| 2009/0327985 A1 * | 12/2009 | Chen | ................... | G06F 30/3312 716/113 |
| 2012/0311515 A1 * | 12/2012 | Zolotov | .............. | G06F 30/3312 716/108 |
| 2014/0130000 A1 * | 5/2014 | Mehetre | .............. | G06F 30/3312 716/108 |
| 2021/0216692 A1 * | 7/2021 | Whitty | .................. | G06F 30/337 |
| 2022/0027542 A1 * | 1/2022 | Nandi | .................. | G06F 30/327 |
| 2022/0083717 A1 * | 3/2022 | Lo | ........................... | G06F 30/33 |

* cited by examiner

*Primary Examiner* — Nha T Nguyen
(74) *Attorney, Agent, or Firm* — Mark H. Whittenberger; Holland & Knight LLP (57) ABSTRACT

Embodiments include herein are directed towards a method for static timing analysis. Embodiments included herein may include providing, using at least one processor, a database of predefined script tags and causing a display of a script at a graphical user interface. Embodiments may also include receiving an insertion of at least one tag from the database within the script and generating one or more timing reports based upon, at least in part, the script and the at least one tag.

14 Claims, 7 Drawing Sheets

SYSTEM AND METHOD FOR PERFORMING STATIC TIMING ANALYSIS OF ELECTRONIC CIRCUIT DESIGNS USING A TAG-BASED APPROACH

FIELD OF THE INVENTION

The present disclosure relates to a method of electronic circuit design, and more particularly, to a method of performing efficient timing analysis of electronic designs.

BACKGROUND

Static timing analysis ("STA") is a method to assess the timing of any given digital circuit using software techniques and certain models that provide relevant characteristics of the digital circuit. High-performance integrated circuits have traditionally been characterized by the clock frequency at which they operate. Measuring the ability of a circuit to operate at the specified speed may require an ability to measure, during the design process, its delay at numerous steps. Moreover, any delay calculation should be incorporated into the inner loop of timing optimizers at various phases of design, such as logic synthesis, layout (e.g., placement and routing), and in in-place optimizations performed late in the design cycle. While such timing measurements may theoretically be performed using a rigorous circuit simulation, such an approach is likely to be too slow to be practical. Static timing analysis plays a vital role in facilitating the fast and reasonably accurate measurement of circuit timing. The speedup comes from the use of simplified timing models and by generally ignoring logical interactions in circuits. This has become a mainstay of design over the last few decades.

SUMMARY

In one or more embodiments of the present disclosure, a computer-implemented method for static timing analysis is provided. The method included herein may include providing, using at least one processor, a database of predefined script tags and causing a display of a script at a graphical user interface. The method may also include receiving an insertion of at least one tag from the database within the script and generating one or more timing reports based upon, at least in part, the script and the at least one tag.

One or more of the following features may be included. In some embodiments, generating may optimize script generation using the at least one tag. Generating may further include parallelizing a plurality of commands associated with the script. The method may also include storing information associated with the one or more timing reports. The information may be stored within one or more global containers. The method may include parsing the one or more global containers based upon, at least in part, a command or a tag. The method may also include providing a user with an option to override at least one of a file based or a collection based redirection of output of global command to individual container.

In one or more embodiments of the present disclosure a computer-readable storage medium having stored thereon instructions, which when executed by a processor result in one or more operations is provided. Operations may include providing, using at least one processor, a database of predefined script tags and causing a display of a script at a graphical user interface. Operations may also include receiving an insertion of at least one tag from the database within the script and generating one or more timing reports based upon, at least in part, the script and the at least one tag.

One or more of the following features may be included. In some embodiments, generating may optimize script generation using the at least one tag. Generating may further include parallelizing a plurality of commands associated with the script. Operations may also include storing information associated with the one or more timing reports. The information may be stored within one or more global containers. Operations may include parsing the one or more global containers based upon, at least in part, a command or a tag. Operations may also include providing a user with an option to override at least one of a file based or a collection based redirection of output of global command to individual container.

In one or more embodiments of the present disclosure, a system for static timing analysis is provided. The system may include a computing device having at least one processor and a memory for storing a database of predefined script tags. The at least one processor may be configured to cause a display of a script at a graphical user interface and to receive an insertion of at least one tag from the database within the script. The at least one processor may be further configured to generate one or more timing reports based upon, at least in part, the script and the at least one tag.

One or more of the following features may be included. Generating may further include parallelizing a plurality of commands associated with the script. The system may be configured to store information associated with the one or more timing reports. The information may be stored within one or more global containers. The at least one processor may be configured to parse the one or more global containers based upon, at least in part, a command or a tag.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings denote like elements.

Figure 1:
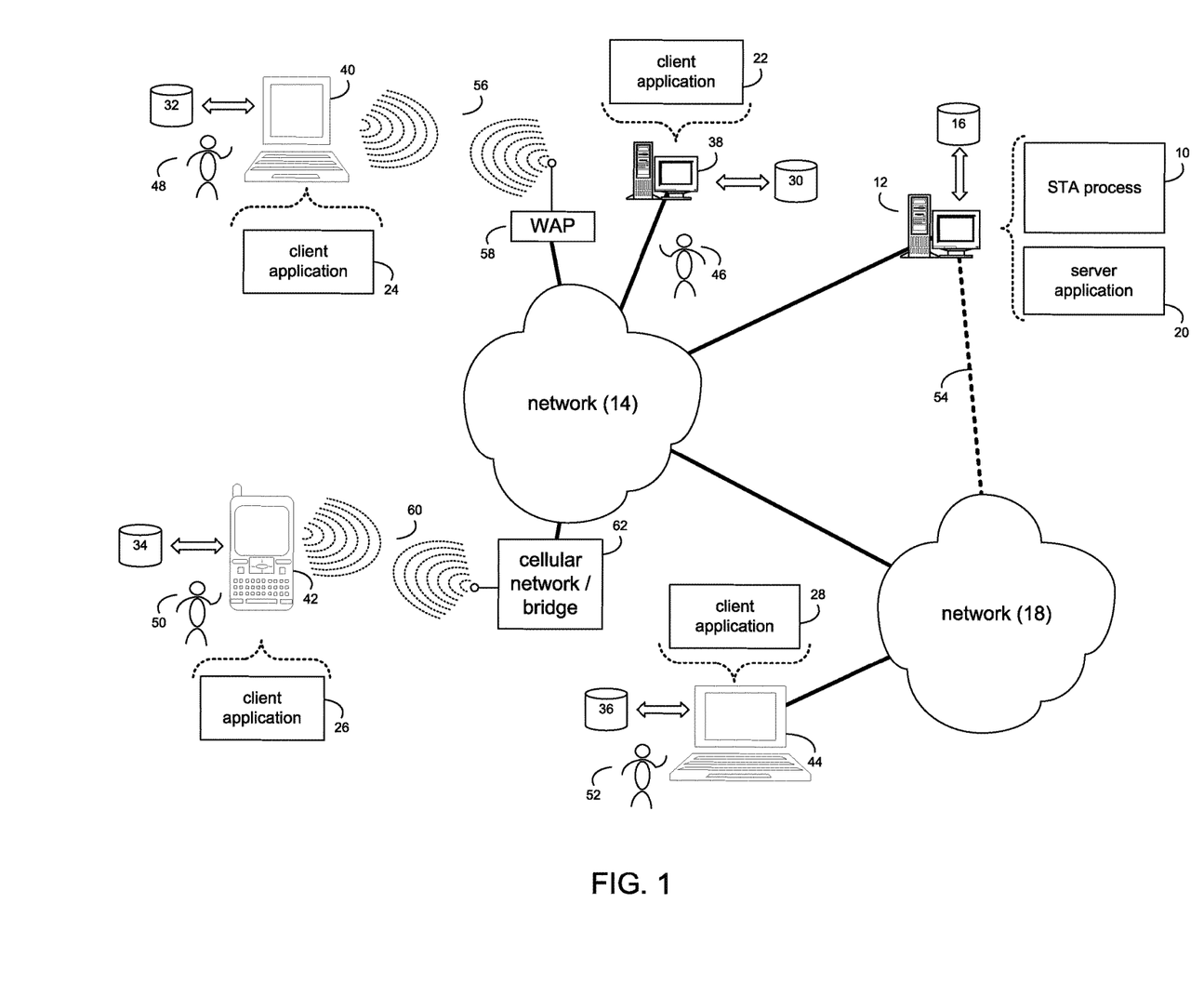
FIG. 1 diagrammatically depicts an STA process coupled to a distributed computing network.

Referring to FIG. 1, there is shown a static timing analysis ("STA") process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, STA process 10 may reside on a client electronic device, such as a personal computer, notebook computer, personal digital assistant, or the like.

The instruction sets and subroutines of STA process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example. Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute STA process 10. Examples of client applications 22, 24, 26, 28 may include, but are not limited to, design verification tools such as those available from the assignee of the present disclosure. These applications may also be executed by server computer 12. In some embodiments, STA process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the STA process may be a client-side application (not shown) residing on one or more client electronic devices 38, 40, 42, 44 (e.g., stored on storage devices 30, 32, 34, 36, respectively). As such, the routing process may be a stand-alone application that interfaces with a client application (e.g., client applications 22, 24, 26, 28), or may be an applet/application that is executed within a client application. As such, the routing process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, STA process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple iOS, ANDROID, or a custom operating system.

Figure 2:
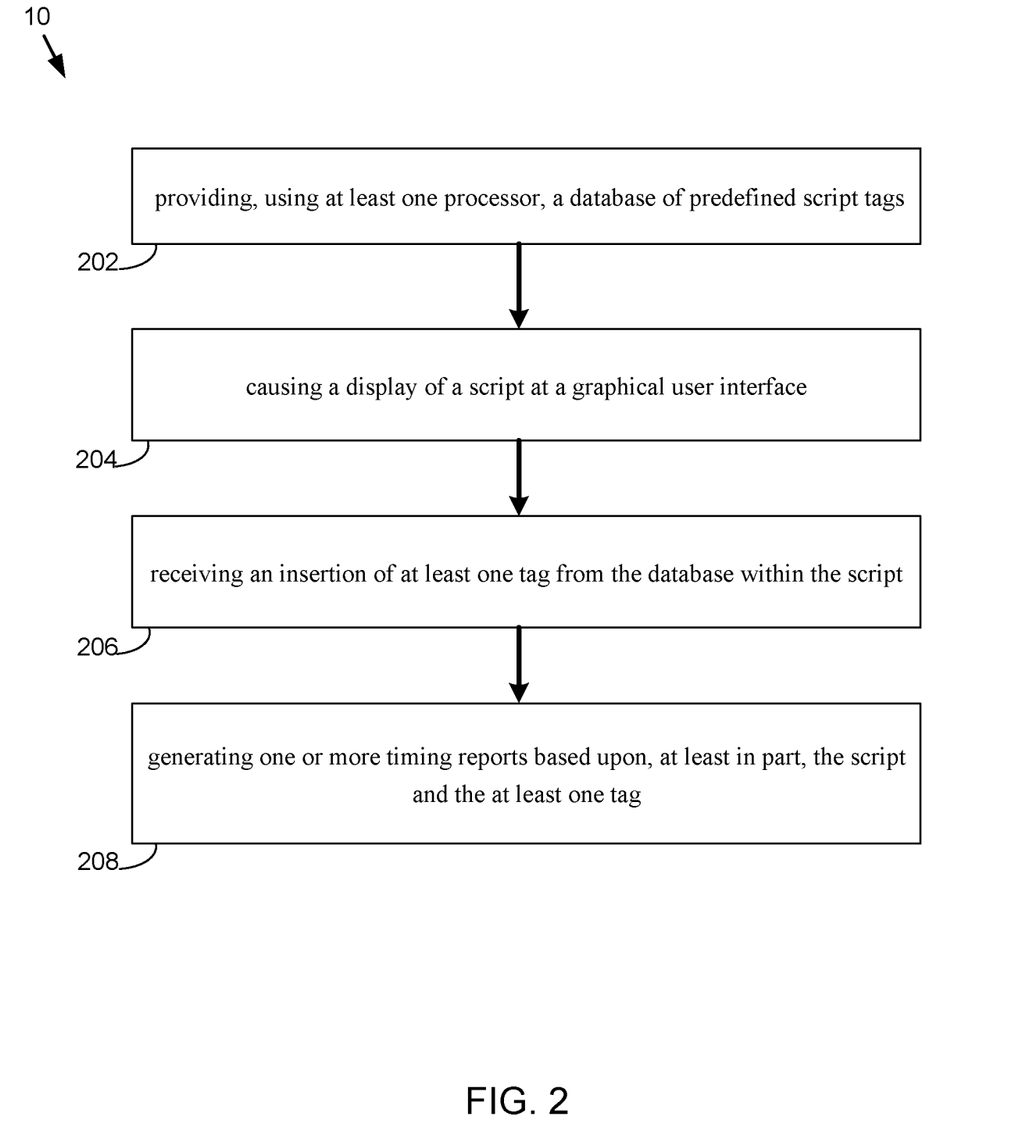
FIG. 2 is an exemplary flowchart of an STA process according to an embodiment of the present disclosure.

Referring now to FIG. 2, a flowchart depicting an embodiment consistent with STA process 10 is provided. The method included herein may include providing 202, using at least one processor, a database of predefined script tags and causing 204 a display of a script at a graphical user interface. The method may also include receiving 206 an insertion of at least one tag from the database within the script and generating 208 one or more timing reports based upon, at least in part, the script and the at least one tag. Numerous additional operations are also within the scope of the present disclosure.

Figure 3:
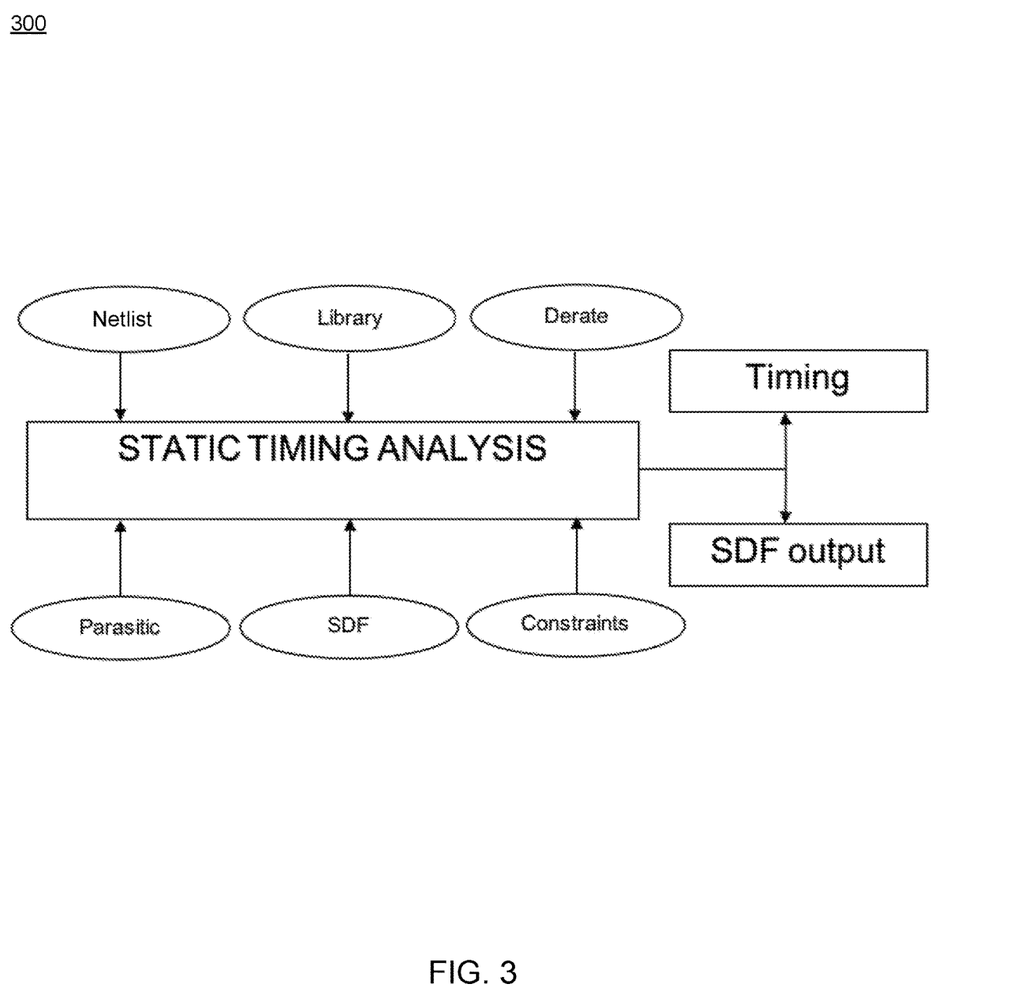
FIG. 3 is a diagram showing an example of input and output models associated with STA process according to an embodiment of the present disclosure.

Referring now to FIG. 3, a diagram 300 showing an example description of the input models that software may include in order to perform the static timing analysis. The term "netlist" as used herein may refer to a model that defines the digital circuit that is being envisioned. Generally, a gate level netlist may be provided as an input model to define the desired functionality. Various kinds of library models may be used to perform static timing analysis. Some of these may include, but are not limited to, Liberty format specified .lib library models for defining the delays of standard digital gates (e.g., AND, OR, NOT, FLOP, LATCH etc.) and MACROS, advanced on-chip variation ("AOCV") models for performing advanced STA, models for performing signal integrity ("SI") analysis, etc. Similar to gates, for interconnects also there exist models which may be generally specified in the standard parasitic exchange format ("SPEF") format. Timing derates are means to model the variation impact, generally during STA. Standard delay format is another means of specifying the inputs delays of gates and interconnects. A set of input system level constraints may be applied which define the desired timing that is envisioned from the digital circuit under consideration.

In some embodiments, the output format of STA software may include a set of timing reports that classify the whole design into various number of paths (subsections of digital circuits) and then state whether each path is meeting the set constraints. Many other types of reports related to various information about the timing graph may also be generated without departing from the scope of the present disclosure.

Figure 4:
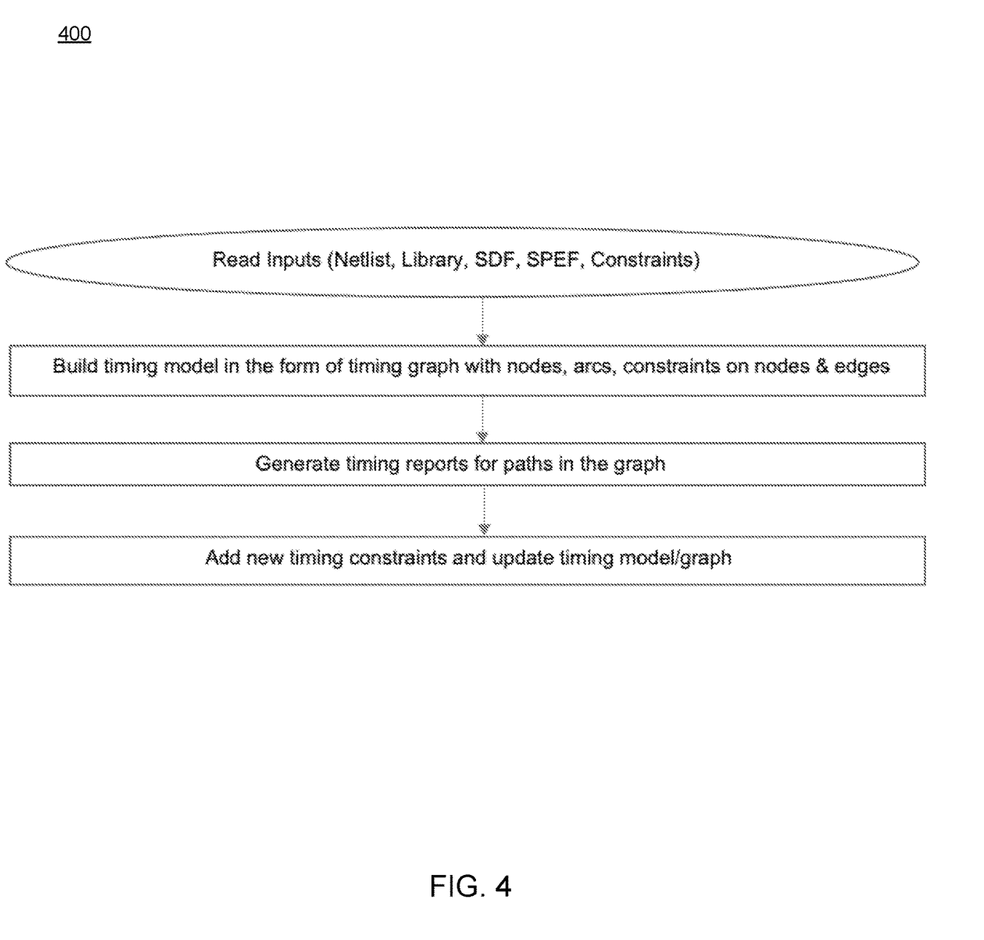
FIG. 4 is a flowchart showing operations according to an embodiment of the present disclosure.

Referring now to FIG. 4, a flowchart 400 showing operations associated with a static timing analysis consistent with embodiments of the present disclosure is provided. In operation, once the inputs are fed to the software, STA process 10 may create an internal model using these inputs that can be used to perform the static timing analysis.

Figure 5:
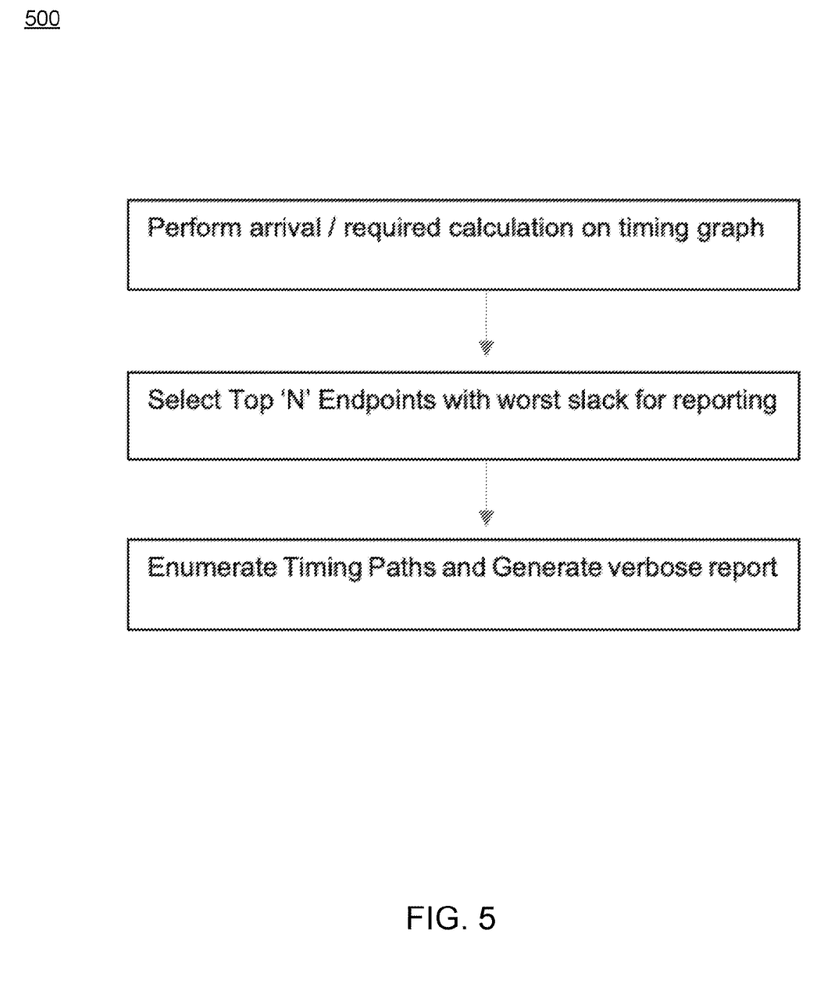
FIG. 5 is a flowchart showing operations consistent with timing report generation according to an embodiment of the present disclosure.

Referring now to FIG. 5, a flowchart 500 showing operations associated with a static timing analysis consistent with embodiments of the present disclosure is provided. In operation, generating timing reports may include performing an arrival/required calculation associated with a timing graph, selecting the top "N" endpoints with the worst slack for reporting, and/or enumerating one or more timing paths and generating the report. More specifically, after reading inputs, the first step that may occur is building a persistent model of STA. In this way, software may internally create a timing graph for the given netlist and then compute the worst arrival and required times on the nodes of the graph. For certain nodes which may be characterized as endpoints, it may also compute the worst slack. Once endpoints are identified, path tracing may begin. For every endpoint in the design, this process may involve tracing backwards towards the begin point to identify the worst path. In certain cases, the top "N" worst paths may need to be traced back. Along with tracing the paths to the begin point, paths may be processed for arrival and required calculation and slacks are generated.

Timing reports are one of the most essential part of timing analysis, as it is the medium through which a designer may output relevant timing information as per a requirement, and use it to analyze and if required, effectively remodel the design for timing closure. STA reporting today involves complex scripting environments to achieve the timing closure. Most major customers in their reporting setup have combinations of native reporting commands and tool command language ("TCL") scripts for custom reporting. Custom reporting broadly may be defined as a set of TCL scripts with TCL procedures aimed to produce a customized report using native tool's commands. These native commands may target a very specific region of design (using very descriptive command specifications) and may be called millions of times in the scripts to generate custom output thereby leading to performance issues. Often custom reporting also changes the state of timing by introducing new or modifying existing environmental settings or constraints. This may pose an additional challenge for overall performance of custom reporting.

Custom scripting in many existing systems can be slow due to several reasons. For example, various tools may have inefficiencies with regard to executing atomic commands in parallel, leading to underutilization of CPUs (sequential nature of scripts). Also, inefficient script coding styles, practices, algorithms or inappropriate choices of native tool's commands are common. Native tool commands can be slow due to certain commands having a very small runtime thereby having multi-threading (MT) scalability issues as well as various algorithmic inefficiencies.

In order to address the problems of tool inefficacies in scripts that call atomic/descriptive commands, embodiments of the present disclosure may rely upon a parallel command infrastructure (PCI), that may focus on making command level multithreading possible for reporting commands.

Many of the tool's reporting commands have short runtimes, especially when they attempt to obtain information about very specific objects in the design or fetch timing paths specific to certain constraints, based upon pins or cells involved in a path. There could be thousands of such commands in a script and at times their number could run in the millions. For example, finding the worst path between all input and output ports of top or various sub modules can have thousands or millions of combinations.

Every tool/reporting command must spend some time in the main thread (without utilizing other threads/CPUs), where it needs to parse the arguments, set the parameters and data structures for the run, and step-by-step lead the flow to various sections from where multi-threading can be invoked. The percentage amount of time spent on such activities in a runtime extensive reporting command (e.g., a report timing command which enumerates millions of paths) is very small.

However, the percentage in small runtime commands (enumerating 1-2 paths via certain pins/points) is considerable.

To illustrate this further, a report timing command with multiple '-through' arguments and maximum paths desired as 1, may completely run in main thread itself, as there is not much to parallelize and improve the runtime for such a small command with the use of multiple CPUs. This leads to underutilization of available CPUs.

As the number of commands increases, the overall runtime spent in the main thread (without utilizing other CPUs) becomes quite significant and is a bottleneck to the overall scalability of the process. The scalability deteriorates even further with the increase in number of available CPUs. Taking an example of 128 small report timing (RT) commands with 16 CPUs. If we assume each command takes 1 second to complete, if run in single thread. In a default multi-threaded run, we can assume 50% of the time is spent in the main thread. Assuming perfect multi-threading for the remaining part and 100% scalability (which is not possible in reality) for the multi-threaded part. The runtime of each command will be ($\frac{1}{2}+\frac{1}{32}$) seconds. For 128 commands, the total runtime will be $128*(\frac{1}{2}+\frac{1}{32})=68$ seconds. The overall scalability of the process with 128 commands is just 128/68=1.88, with 16 CPUs. If we increase the number of CPUs to 32, the total runtime of commands will be $128*(\frac{1}{2}+\frac{1}{64})=$ 66 seconds. There is hardly any gain in overall runtime by doubling the number of CPUs. Defining the average CPU usage ratio as ((Total Single thread CPU time)/(Number of CPUs)*(Total MT real time)), the average CPU usage ratio with 16 CPU is just 128/(16*68)=0.12. And just 0.06 seconds with 32 CPUs, compared to the ideal best-case average usage for the flow, which is 1. This example shows that for a large amount of process time, the CPUs were idle while running 128 commands.

Most of the reporting commands have existed for more than 15 years, and multiple efforts were made over the years to optimize their run-time. While the improvement in runtime was achieved at a rate of several times (termed as X) faster each year initially, currently the commands are already running with advanced algorithms and optimized C++ data structures and hence require a very high effort from software developers to obtain even a small percentage of improvement.

Moreover, STA reporting is more than simply tool commands specified one after another. They are a mix of tool commands (in multiple incarnations with different arguments), a highly complex and comprehensive TCL infrastructure (that may serve their custom reporting needs) and reporting data set, required by their homegrown utilities and tools for fixing and other purposes.

Accordingly, embodiments of STA process 10 included herein may improve the complete process, rather than improving individual commands which may be contributing to the overall STA cycle time moderately or significantly. This may be achieved by utilizing the maximum percentage of total CPUs, during the complete run of the reporting part of the script.

In some embodiments, and in order to reduce the overall runtime associated with reports generation by users, STA process 10 may include a tag/annotation based method. Using this approach the overall runtime of the reporting flow is improved, rather than improving an individual reporting command. The tag-based system may include a library of tags, which the user may intelligently insert at various places in the script to improve the runtime. The term "tag", as used herein, may include an annotation that may be inserted within a script. These may include, for example, any command/globals that may be defined using a set_global command in software, TCL variables, and/or any annotation in a script using comments/etc.

In some embodiments, one or more tags may either be specified by user with its own understanding or based on another pre-processing intelligent infrastructure which can guide user to modify the script to suite the new flow. The tags may be interpreted by STA process 10 to enable parallelization of commands at the global script level. This infrastructure which parallelizes the reporting commands at global script level is referred to herein as a Parallel Command Infrastructure (PCI).

In some embodiments, the one or more tags may guide the PCI with various information. Some information may include, but is not limited to, which reporting commands are required to be or that may be parallelized, where to start and end the parallelization (e.g., this may be decided, based on where the output of the set of reporting commands will be required or where the constraint/settings are changed in the system, leading to a timer update), when to interrupt and flush the commands (this may be required when the global settings are changed in the system which could affect reporting commands or when enough accumulation of commands has been done that could result in memory increase), and/or force the commands into parallelization, which by default may not be decided to be parallelized by the PCI analyzer.

In some embodiments, PCI may work through optimizing the runtime of a complete reporting script, instead of targeting an individual reporting command. This may be achieved by analyzing reporting commands, to decide if they can be parallelized, and if they can, then accumulating various commands (e.g., report_timing, check_timing, all_fanout etc.), during the execution of the script and analyzing dependencies and other parameters (e.g., similar runtime, memory requirements, data structure dependencies) among them to create various sets and finally launching commands in each set together, using parallel threads. This helps in achieving very high CPU utilization and makes the PCI infrastructure suitable for various reporting commands.

It should be noted that embodiments of the present disclosure may allow for launching any type of reporting commands in parallel, as long as they include a comparable runtime in a single thread and do not have interdependencies.

Figure 7:
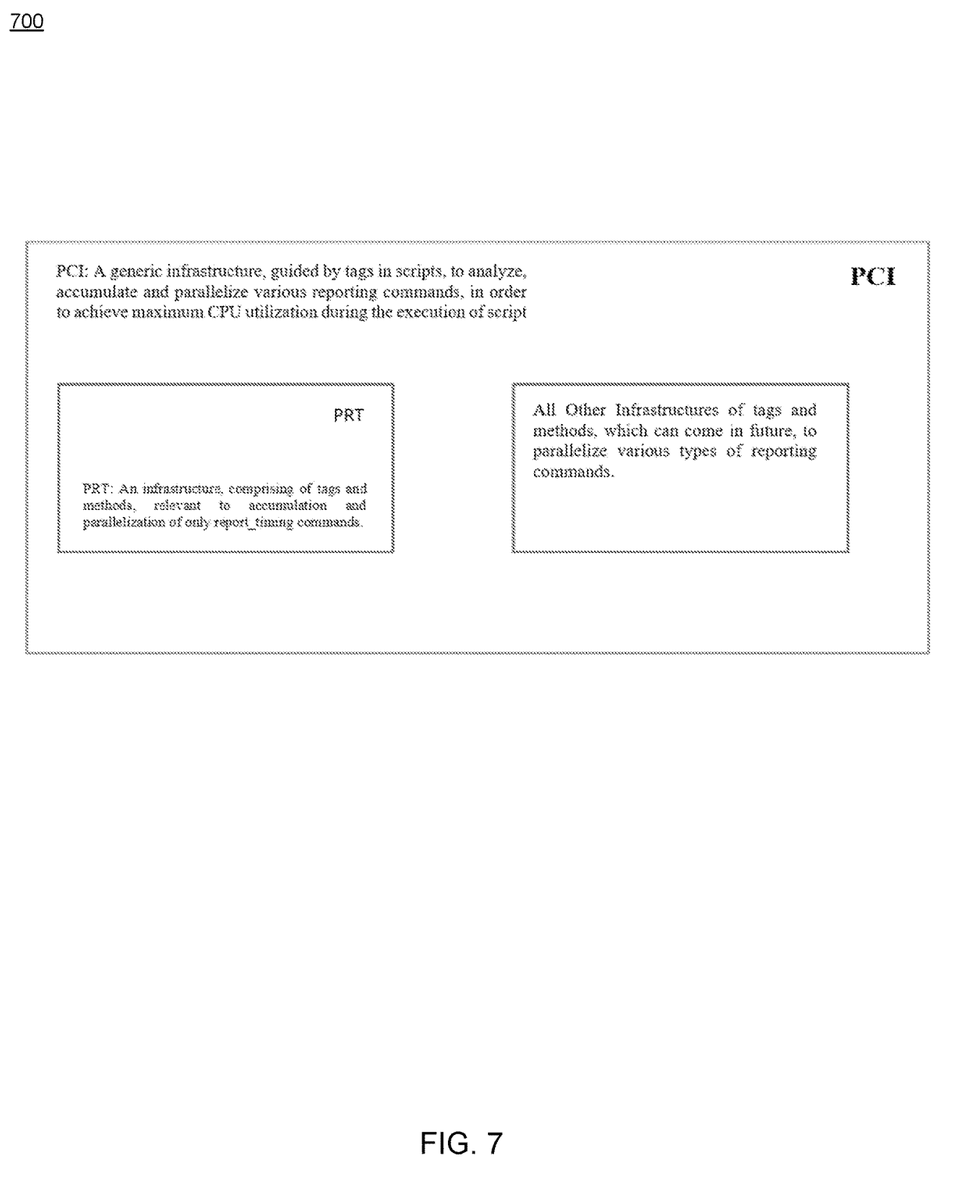
FIG. 7 is a diagram showing an example of PCI and PRT according to an embodiment of the present disclosure.

In some embodiments, the PCI technique has a wide application to variety of reporting commands. For example, some of these may include report timing to report paths from timing graph, all fanout to output pins in incoming/outgoing cone from any dedicated pin, get cells, get pins etc. to fetch various type of netlist object, etc. Embodiments included herein provide the concept of a PCI infrastructure by showing how it is designed for a report timing (RT) command. The parallel command infrastructure written for enhancing the process of a report timing command is referred to herein as a Parallel Report Timing "PRT" as is discussed in further detail hereinbelow. PCI may refer to a super set of PRT. PRT may focus on accumulating report_timing commands for parallel runs, while PCI may refer to a generic infrastructure which may be used to parallelize any reporting command. FIG. 7 depicts one example of this relationship.

As discussed above, one commonly used reporting command by customers is the report timing (RT) command and it is also quite a dominant command in terms of runtime. The RT command is commonly used in scripts to report the top worse paths in the design or with various combinations of from/through/to pins, to report paths via various pins or between various source and destination points in a timing graph. Apart from this, the RT command has many options catering to various choices and flows. For example, reporting global based analysis (GBA) paths, reporting path-based analysis (PBA) paths, reporting unconstrained paths, reporting clock style check paths, reporting data paths, and many more cases. Due to this, there may be thousands of report timing commands possible in the script (at times even ranging to millions).

Accordingly, the PRT methodologies associated with STA process 10 described herein include a guided infrastructure (e.g. using a tag based approach), to improve the runtime of scripts by intelligently identifying and clubbing a number of report timing (RT) commands together, in order to run them in parallel threads. PRT may not look for improving an individual RT command, instead it may attempt to intelligently improve the runtime of the set of report timing commands, embedded in between the complete script, by parallelizing the time spend by each command in the main thread.

In some embodiments, STA process 10 may allow a user to create a simple tag-based system, where the user may insert tags in a script with ease, without making changes to any already existing line in the script, in order to reduce the total runtime over the execution of all the report timing commands present in the complete script, and without any change in desired results.

In some embodiments, no change may be required in the existing lines in script. Only new lines (e.g., tags) may be added to the script. The user may insert one or more PRT tags at the start and end of the script (or subportion of the script) and the system may parallelize the report timing commands present in the script on its own, based upon default rules. A set of tags may be available to the user to modify the default rules. The user may intelligently insert various tags in the script, to tune and control the output, memory, performance, etc. The whole PRT infrastructure may be turned OFF using a single global at the top of the modified (e.g., with tags inserted) script and the script may run in its original form as if no tags were inserted.

In some embodiments, the PRT may be equipped with various tags that the user may use to run an individual RT command in its original form (outside the PRT infrastructure), or run an RT command from the main thread (e.g., with the command's native multi-threading flow) and collect the output data in PRT containers, or run an RT command in parallel and collect data in PRT containers, and/or manage the PRT containers memory and perform additional operations. Results from all of the commands may be available to the user at the end of the PRT infrastructure, defined by end tag.

An example of STA process 10 is described below wherein the PCI approach is demonstrated using the report timing command as a reference, also called the PRT infrastructure. However, embodiments of the present disclosure may be extended to numerous other reporting commands.

In some embodiments, each report timing command may correspond to a task or a job for the PRT system. The PRT may analyze each job and decide how to treat it. For example, whether to launch it immediately from the main thread using native multi-threading of the individual command, or to add the job in a queue as per its type and launch it later when the queue has enough jobs to achieve good parallelism, or to act as a transparent system and allow the job to run as if PRT doesn't exist.

In operation, the user may enable the PRT system by setting up the tags. One use-model could be to enclose the entire STA reporting script inside "start prt" and "end prt".

start prt -collection pcol
CUSTOMER SCRIPT SECTION
end prt

In some embodiments, the paths created by report timing commands lying within the above start and end constructs may be directed to go either into the global collection (e.g., pcol mentioned in start prt command), or to any global file (e.g., if -file was used instead of -collection in start prt command), or to any local path collection or local file given as individual report timing command's argument.

In some embodiments, the PRT infrastructure may ensure that any report timing command, given between the above-mentioned start prt/end prt commands, adds the output paths to the collection 'pcol' while parallelizing the report timing commands appearing in between, if possible.

In some embodiments, the PRT infrastructure may include a manager, analyzer, and launcher as is discussed below in greater detail. The manager may be responsible for managing the complete infrastructure by organizing queues, storages and processing information which may affect the parallelization of tasks, overwriting the decision made by analyzer, setting up the timer if required and calling the launcher to process the tasks. The analyzer may be responsible for analyzing the PRT jobs and deciding whether the job needs to be launched in parallel or not. The analyzer may receive inputs from the PRT Manager in the form of user-defined overrides or previous commands' run behavior and analysis, to make intelligent decisions. The launcher may be configured to launch PRT jobs into separate threads or in the main thread. It also analyzes the task queues to decide if sufficient tasks have accumulated in a queue so that they can be launched in threads to achieve good CPU utilization.

Figure 6:
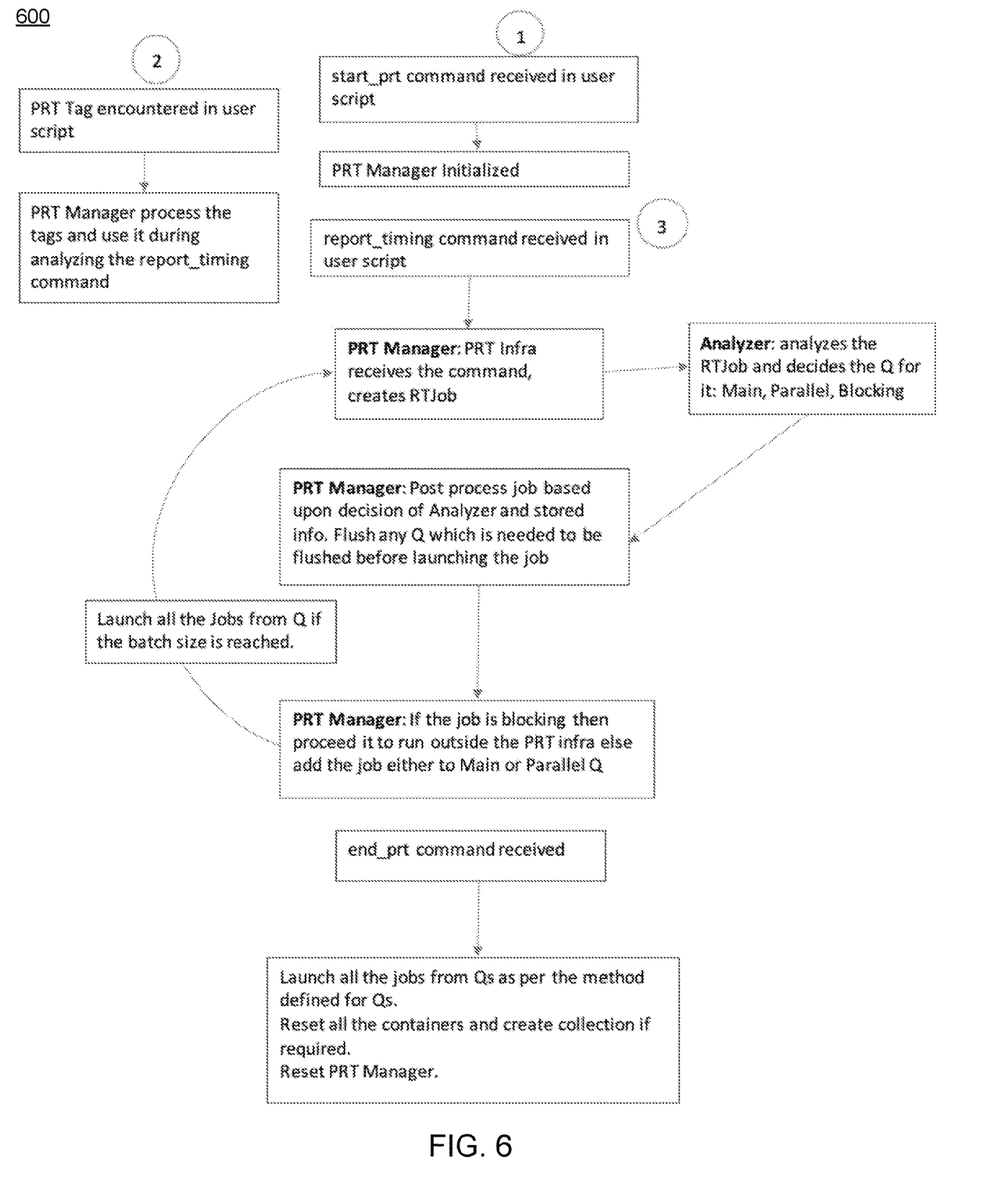
FIG. 6 is a flowchart showing operations according to an embodiment of the present disclosure.

Referring now to FIG. 6, a flowchart 600 showing example operations consistent with embodiments of STA process 10 is provided. First, a start prt command may be executed. It may then initialize the PRT infrastructure manager and set up basic containers. Then, a report timing command may be received by the system. The command may be parsed and submitted to the PRT manager. The manager may then create a job (RTJob) from the command and pass the RTJob to the analyzer. The analyzer may review the RTJob to classify it into one of the three types: RTJob-Main, RTJobParallel, RTJobBlocking. RTJobMain refers to a type of job that may be launched from the main thread with native multi-threading and run within the purview of PRT infrastructure. The results may be collected in the containers maintained by PRT manager. RTJobParallel refers to a type of job that may be queued by the PRT infrastructure and launched from separate threads from time to time within the scope of the PRT infrastructure and the results may be collected in the containers maintained by the PRT. RTJob-Blocking refers to a type of job that may run outside the PRT infrastructure as if no PRT infrastructure exists and the results may be collected as per the options given in the individual report timing command itself. While analyzing, the analyzer may receive guidance from the PRT manager to decide how to classify the task. Once the result of classification is received back by the manager from the analyzer, the manager may decide whether to accept or override the classification performed by the analyzer. This may be performed in order to satisfy various restrictions, based upon timing engine limitations, global caches and dependencies, etc. The manager may then assign the task to different task queues, especially designed to handle various scenarios, such as small tasks, large tasks and/or tasks with specific report timing options. A FastQ generally refers to a task that may be assigned to this queue if it is classified as RTJobParallel. Generally, it is a task with a small runtime. A MainQ generally refers to a task that may be assigned to this queue if it is identified to be launched from the main thread with native MT, essentially an RTJobMain type task. This is ideally for long report timing tasks.

A NotThruQ generally refers to a special queue maintained for report timing tasks which has not through options associated with it. This may be maintained because of the dependencies of such tasks in the global cache which may be set/reset based upon a not through pin set. Therefore, this queue needs to be flushed more frequently than other queues. A FileQ queue may be maintained if the output of tasks is required to go to separate files instead of global collection provided with start prt command. Once the task is added to a queue, the launcher decides if it should start launching the tasks from this queue and also from any other queues, based upon certain conditions and if it does decide to launch, it flushes the required queues. The system continues with the processing of the next report timing command. When the end prt command is reached, the system performs the following tasks. The process may flush all the queues, move the paths stored in its container to the collection specified in start prt command or output the paths to corresponding files if -file option is used in start prt command, reset all the containers, and/or reset the parallel infrastructure manager.

In the default mode, STA process 10 may allow the user to insert "start.prt" and "end.prt" commands at the beginning and end of the script respectively and enable the PRT infrastructure by switching on a global. A global collection (PRT collection) may be assigned along with a "start.prt" command into which the resulting paths from report timing commands may be added by the infrastructure.

An example script is provided below:
set_global_timing_report_enable_parallel_infra true
start_prt-collection pcol
source report.tcl
end_prt where_timing_report_enable_parallel_infra is the global which enables PRT flow. "start_prt" and "end_prt" are PRT tags specifying the start and end of parallelization of report_timing_commands and report.tcl is the original user script called after update_timing with several report_timing_commands embedded in it.

In some embodiments, the default mode may utilize some or all of the following rules. Any report timing command which has its output to a file or local collection may be treated as blocking and may be launched outside the PRT infrastructure in the same way as in non-PRT flow. The output of the command goes to the respective file or collection given in report_timing command. Any report_timing commands which are output to screen (stdout) may be run within the scope of PRT infrastructure, and the output of command goes to the PRT collection. Any report_timing commands which use max paths greater than 1 may be launched within the scope of PRT infra but from main thread, using the native multi-threading just as in non-PRT flow. The output paths from the command may be added to the PRT collection. Any report_timing commands which have one maximum path may be analyzed and either run from the main thread or in parallel based upon the analysis and the output paths may be added to the PRT collection. Any report_timing command which includes certain options, to perform a specific task or flow, may be treated as blocking and may be launched outside the PRT infrastructure in the same way as in the non-PRT flow.

In some embodiments, the user may be equipped with various tags to overwrite the default behavior and improve the runtime and memory of script without modifying the existing lines in script. Some example tags, which the user may use to overwrite the default behaviors and tune the PRT flow to as desired are provided below. It should be noted that numerous other tag types are also within the scope of the present disclosure.

"prt override file output -start" may be used to run the report_timing commands outputting to file via PRT infra and collecting the paths in PRT collection.

"prt override file output -end" may be used to stop the file output override instructions as given using start command.

"prt override collection output -start" may be used to run the report_timing commands outputting to collection via PRT infra and collecting the paths in PRT collection.

"prt override collection output -end" may be used to stop the collection output override instructions as given using start command.

"prt force max paths in thread -start" may be used to override PRT analyzer instructions to launch max paths command (e.g. "report timing -max paths 100") via main thread. Such commands by default are launched from main thread within the PRT infrastructure. Analysis for the command is still done by analyzer to check if other conditions meet for parallel launch.

"prt force max paths in thread -end" may be used to stop the instructions given via start command.

"prt all commands transparent -start/-end" may be used to enable/disable PRT infra to act as a transparent system even though every report timing command is routed via it. This can be used to generate performance/memory statistics for original script.

"flush prt" may be used to launch (run) all the report timing commands immediately, which are accumulated in the system. This is useful when the user wants to change some settings which can affect the output of report timing commands.

"flush prt add to collection" may function similar to flush prt command but also update the global collection given in start prt command with the output paths from report timing commands which are otherwise lying in internal storage of PRT manager. By default, the global collection is guaranteed to have all the paths only after end prt command is executed.

"empty prt collection" may empty the global collection given in start prt command without destroying the collection variable in script. This can be used by user after he has flushed and utilized the global collection intermediately and no more need the older commands outputted paths. Helpful for segregating section wise processing of output and also manage memory efficiently.

In some embodiments, STA process 10 may include a feedback infrastructure that may be embedded inside the PRT infrastructure to provide guidance to the user and/or to help them insert tags in the script. The feedback system may also create a database which may assist the PRT infrastructure to further optimize the successive runs of the same script.

In some embodiments, to generate the feedback data, the user may enable a feedback protocol along with the start_prt command. The PRT infrastructure may then collect runtime, CPU utilization and other information for each report_timing command and compile it to give meaningful inputs to the user to insert tags in the script. For example, the user may club '-max_paths' (enumerating more than 1 path) based report_timing commands to run them in parallel via the PRT infrastructure rather than native multi-threading, if the runtime of many such commands is equivalent to each other. This may help in higher utilization of CPUs. Note, that by default any '-max_paths' (greater than 1) based report_timing command may not be parallelized at the command level and may be run with native multi-threading. Another example is that the user (or PRT infrastructure itself), may force all unconstrained path commands into parallel by pre-building unconstrained arrival times on all the pins, if it notices that many of the unconstrained paths commands are encountered in the script. By default, the PRT infrastructure may not launch 'report_timing commands to report unconstrained paths' in parallel, as it may require building of arrival times by timing engine, which may not be supported via worker threads. The feedback infrastructure of PRT is not only useful for improving PRT runtime but may also help in analyzing the original reporting script.

Embodiments of the present disclosure provide the user a mechanism to improve the runtime of existing scripts by simply adding few tags thereto. With the tags inserted, it is expected that the overall script flow time may either improve or remain the same as before. This may help the user in reducing the runtime by higher utilization of CPUs and without any script modification.

Apart from its use to improve the runtime of the collection of report timing commands, an additional use of STA process 10 may also be made to collect output paths from various commands into a single container and then use the container for future processing. This may be particularly useful when the user has written the original script in a way that it creates small-small path collections out of report timing commands, which may be processed immediately, thus being unable to utilize the CPUs effectively.

In some embodiments, the user may have the option to modify the original script to output all the paths generated from report_timing_command to the screen (stdout) and add the start_prt and end_prt commands at the beginning and end of script. This may result in the PRT following the default rules and attempting to parallelize all the report timing commands as per the default rules set internally in it. The downside of this approach is that all the paths may be sent to the PRT container and get flushed into collection only when the end_prt command appears. This may lead to high peak memory. Also, the user may not have original commands outputting to screen, therefore it may need to modify the original script's lines for commands to be considered under the PRT flow.

In some embodiments, the user may be provided with the knowledge of various existing tags and methods so that he/she may control the parallelization flow and memory, without changing anything in the original script. In this way, the user may intelligently insert the tags to parallelize the smaller runtime commands and leave the large runtime commands as they are. This will help in running the large commands using the native multi-threading and the output going to respective files given in the local command. At the same time, the process may parallelize the blocks belonging to smaller commands and with the output getting collected in PRT containers. As such, a user may choose large commands for native multi-threading and small commands for command level parallelization via the PRT infrastructure. The sample script example below is a representation of such an intelligent scripting mechanism. Here, the user may also have control over the overall memory of the flow as there are tags available with for the user to flush PRT containers for collection and output the resulting collections to a file.

The following example shows how the tags from the PRT library may be used to improve the runtime of any existing customer script for reporting paths. The tags below (bolded) may be inserted on top of original script. Switching OFF the master global_timing_report_enable_parallel_infra, at the start of script may let the script run in the exact original form. At the end of script, the reports generated for paths which were run in parallel in the PRT flow may appear in the prt_parallel.rpt file and the corresponding paths may appear in the non_prt.rpt in non-prt flow.

```
set_multi_cpu_usage -localCpu 32
PRT Enable/Disable global
set_global_timing_report_enable_parallel_infra true
report resource -start FULLFLOW
start_prt -collection pcol
report_timing -pathtype full_clock > rt.rpt
report_timing -max_paths 200000 -nworst 10 -path_type full_clock >> rt.rpt
# Reporting paths from every input to every output
set allinp [all_inputs]
set all out [all_outputs]
prt_override_file_output -start
foreach_in_collection inp $allinp {
        foreach_in_collection out $allout {
               report_timing —from $inp —to $out —path_type full_clock >> rt_in_out.rpt
        }
}
print_prt_stats
# ===================================================
set beginpoints sort_collection [all_registers —output_pins] hierarchical_name]
set endpoints [sort_collection [all_registers —data_pins] hierarchical_name]
# ===================================================
catch {exec rm —rf ${dir}/rt_from_begin.rpt }
report_resource —start rt_from_bp
foreach_in_collection beginpoint ${beginpoints}{
        report_timing —from ${beginpoint} —path_type full_clock >> $dir/rt_from_begin.rpt
}
report_resource —end rt_from_bp
catch {exec rm —rf $dir/rt_to_end.rpt }
report resource —start rt_to_ep
foreach_in_collection endpoint ${endpoints}
        report_timing —to ${endpoint) —path_type full_clock >> $dir/rt_to_end.rpt
}
```

```
report_resource —end rt_to_ep
prt_override_file_output -end
print_prt_stats
report_resource —start end_prt_cmd
end_prt -debug_stats
report_resource —end end_prt_cmd
# The following will be ineffective in non—prt flow as the size of $pcol will be 0
report_resource --start print_pcol
set sizepcol [sizeof.collection $pcol]
if {$sizepcol >0}{
report_timing $pcol -path_type full_clock >$dir/prt_parallel.rpt
}
report_resource —end print_pc
report_resource —end FULLFLOW
# The following will be ineffective in PRT flow as the following flies will be empty
catch {exec rm —rf $dir/non_prt.rpt}
catch {exec touch $dir/non_prt.rpt}
catch {exec cat $dir/rt_in_out.rpt >> $dir/non_prt.rpt }
catch {exec cat $dir/rt_from_begin.rpt» $dir/non_prt.rpt }
catch {exec cat $dir/rt_to_end.rpt >> $dir/non_prt.rpt }
```

As discussed herein, the PCI of STA process 10 is a very powerful tool to optimize the overall runtime of the script. It helps in achieving high utilization of CPUs for overall scripts, which is not possible if the script has small-small commands which spend most of their time in the main thread. PCI has a vast scope of applications. While the present disclosure has focused upon the PCI application to the report_timing command, however, PCI may be extended to a wide array of reporting and constraint commands and a variety of object finding commands. Many new commands (e.g., report_begin_end_pair to report all possible paths between each begin and end pin in design) and infrastructures (e.g., 3D IC framework) are envisioned. The PCI infrastructure described herein may be extended to many constraint commands, such as all_fanout, all_fanin etc. to collect design objects corresponding to various queries, in parallel.

Embodiments included herein also allow for the marking of a script with tags and for guiding the system to parallelize the commands. The process also allows for the ability to store information in a global data structure across all report timing commands.

Embodiments of STA process 10 may provide the ability to optimize intelligently the overall STA scripts at runtime. STA process 10 includes a new method to achieve this via tags/annotation/globals available via a user interface to guide and optimize the existing user script by inserting information within the script. This new user interface in the form of tags or globals or commands may allow the user to optimize the runtime on top of the existing user scripts.

Embodiments of the present disclosure have also provisioned a new framework which enables existing analysis/reporting commands/user interfaces pass through it and automatically determine dependencies across various commands in order to run them in parallel and optimize overall performance of sections marked via tags/annotations/globals etc. in user scripts. Embodiments of the present disclosure provide the ability to act as a transparent system to profile performance and memory of STA scripts thereby providing guidance to the user to intelligently insert tags in scripts which may be used in successive runs. The system may also provide information in the form of database/file/in-memory and use this information to optimize the runtime and memory of script in successive runs.

Embodiments of the present disclosure provide the ability to act as a completely transparent system to the user by letting each reporting command flow via it and also to generate statistics at the end for the user to find performance issues in the user script. The user may embed start/end related information separately in every section of script and collect section-wise statistics.

Embodiments of the present disclosure provide the ability to act as a system to selectively collect output information from specified user interfaces in global containers from inside of a tool, without any change in the user script. STA process 10 may also provide the ability to process these collections using new command/tags/globals, while still maintaining the container in the user script context without destroying it. The system also provides the ability to override file-based redirection of output of individual command to global containers to improve the efficiency of specified STA reporting in user scripts as well as provides the ability to override collection-based redirection of output of individual command to global containers to improve the efficiency of specified STA reporting in user scripts.

Embodiments of the present disclosure provide a generic framework which can be applied to various types of reporting commands, which are currently optimized for performance only via efficient algorithmic/C++ implementation or native multi-threading embedded at the command level itself. The framework may operate from outside at the shell/tcl script level to achieve maximum utilization of CPUs, without analyzing a command's (or other user interfaces) own native multi-threading implementation.

It will be apparent to those skilled in the art that various modifications and variations can be made in the STA process of embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for static timing analysis comprising:
   providing, using at least one processor, a database of predefined script tags;
   causing a display of a script at a graphical user interface;
   receiving an insertion of at least one tag from the database within the script at the graphical user interface; and
   generating one or more timing reports based upon, at least in part, the script and the at least one tag, wherein generating optimizes script generation using the at least one tag and includes parallelizing a plurality of commands associated with the script.

2. The computer-implemented method of claim 1, further comprising:

storing information associated with the one or more timing reports.

3. The computer-implemented method of claim 2, wherein the information is stored within one or more global containers.

4. The computer-implemented method of claim 3, further comprising:

parsing the one or more global containers based upon, at least in part, a command or a tag.

5. The computer-implemented method claim 1, further comprising:

providing a user with an option to override at least one of a file based or a collection based redirection of output of global command to individual container.

6. A non-transitory computer-readable storage medium having stored thereon instructions that when executed by a machine result in the following operations:

providing, using at least one processor, a database of predefined script tags;

causing a display of a script at a graphical user interface;

receiving an insertion of at least one tag from the database within the script at the graphical user interface; and generating one or more timing reports based upon, at least in part, the script and the at least one tag, wherein generating optimizes script generation using the at least one tag and includes parallelizing a plurality of commands associated with the script.

7. The non-transitory computer-readable storage medium of claim 6, further comprising:

storing information associated with the one or more timing reports.

8. The non-transitory computer-readable storage medium of claim 7, wherein the information is stored within one or more global containers.

9. The non-transitory computer-readable storage medium of claim 8, further comprising:

parsing the one or more global containers based upon, at least in part, a command or a tag.

10. The non-transitory computer-readable storage medium of claim 6, further comprising:

providing a user with an option to override at least one of a file based or a collection based redirection of output of global command to individual container.

11. A system comprising:

a computing device having at least one processor and a memory for storing a database of predefined script tags, wherein the at least one processor is configured to cause a display of a script at a graphical user interface and to receive an insertion of at least one tag from the database within the script at the graphical user interface, the at least one processor further configured to generate one or more timing reports based upon, at least in part, the script and the at least one tag, wherein generating optimizes script generation using the at least one tag and includes parallelizing a plurality of commands associated with the script.

12. The system of claim 11, further comprising:

storing information associated with the one or more timing reports.

13. The system of claim 12, wherein the information is stored within one or more global containers.

14. The system of claim 13, further comprising:

parsing the one or more global containers based upon, at least in part, a command or a tag.

* * * * *